(No Model.)  3 Sheets—Sheet 3.

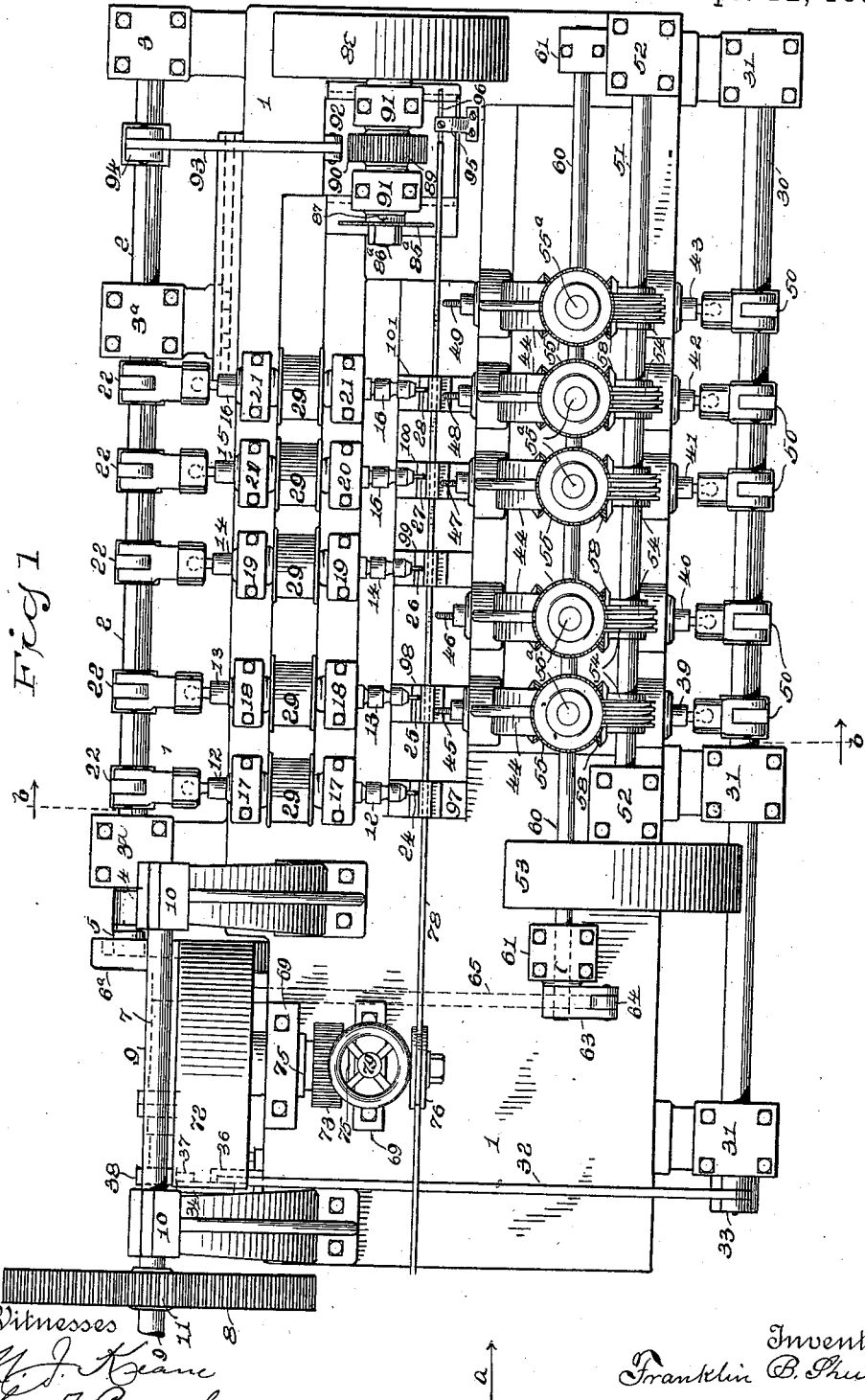

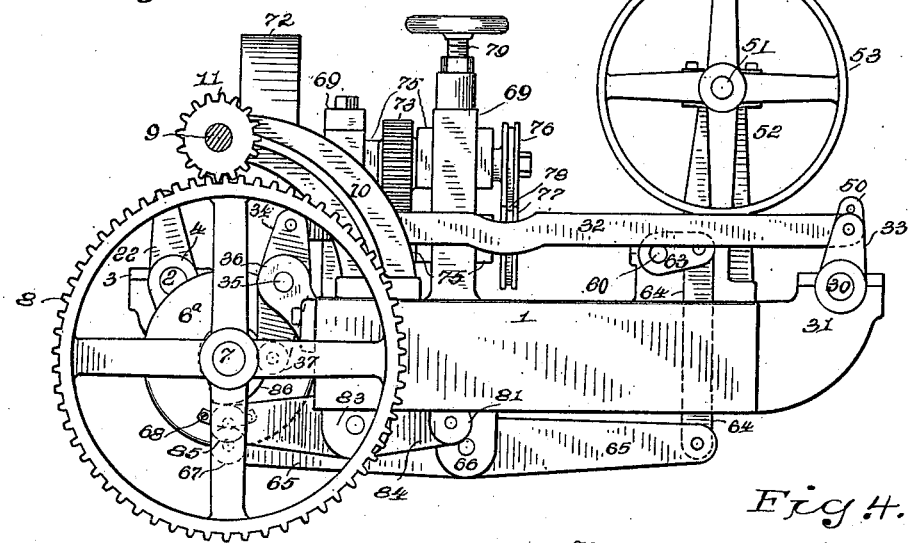

F. B. SHUSTER.
DRILLING AND TAPPING MACHINE FOR DOOR KNOB SPINDLES.

No. 602,272. Patented Apr. 12, 1898.

Witnesses
H. A. Lamb
M. J. Kane

Inventor
Franklin B. Shuster
By Geo. D. Phillips
his Attorney

UNITED STATES PATENT OFFICE.

FRANKLIN B. SHUSTER, OF NEW HAVEN, CONNECTICUT.

DRILLING AND TAPPING MACHINE FOR DOOR-KNOB SPINDLES.

SPECIFICATION forming part of Letters Patent No. 602,272, dated April 12, 1898.

Application filed June 16, 1897. Serial No. 641,010. (No model.)

*To all whom it may concern:*

Be it known that I, FRANKLIN B. SHUSTER, a citizen of the United States, and a resident of New Haven, in the county of New Haven and State of Connecticut, have invented a certain new and Improved Drilling and Tapping Machine for Door-Knob Spindles, of which the following is a specification.

My invention relates to an automatic machine for drilling and tapping door-knob spindles and articles of like character; and it consists in certain details of construction to be more fully set forth in the following specification and such characteristic features believed to be new particularly pointed out in the claims.

To enable others to understand my invention, reference is had to the accompanying drawings, in which—

Figure 6:
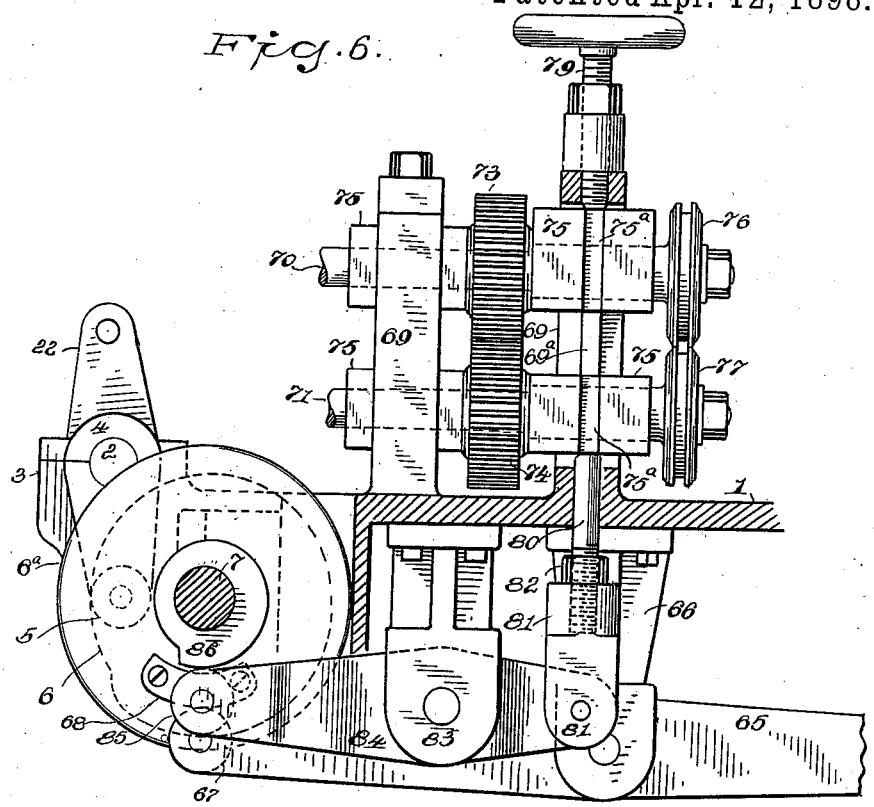
Figure 7:
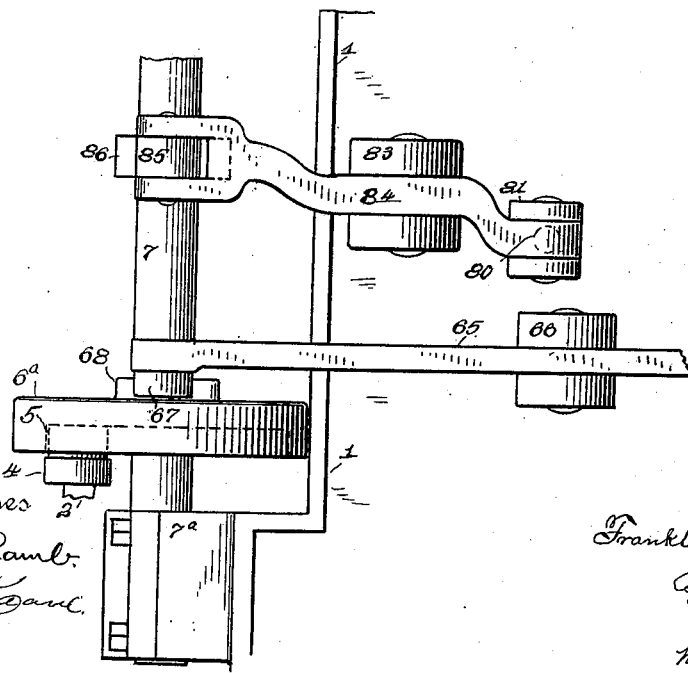

Figure 1 represents an upper plan view of the machine, with broken view of one of the several operating-shafts. Fig. 2 is an end elevation of the machine looking in the direction of arrow *a*, Fig. 1, with the drilling and tapping spindles omitted. Fig. 3 is a sectional end elevation of the machine on line *b b* of Fig. 1, showing the drilling and tapping spindles and the manner of operating them and also the rotary saw or cutter for cutting off the spindle-sections from the rod. Fig. 4 is a detail view of the strip from which the spindles are cut, showing the several operations of drilling and tapping thereon. Fig. 5 is a full-size detail view of a completed door-knob spindle just as it is severed from the rod. Fig. 6 is a broken elevation, partly in section, of the feed-roll frame, bed, and broken view of one of the operating-levers. Fig. 7 is a broken view of the reverse side of the bed, showing some of the shafts, cams, and levers connected therewith.

The manufacture of door-knob spindles, such as shown at Fig. 5, has heretofore been done by hand—*i. e.*, the pieces have been first cut to length and the several holes for the knob and washer screws drilled and tapped separately—as it was considered impossible to arrange a series of drill and tapping spindles in line, so as to operate together, owing to the close proximity of the holes with each other. In other words, the holes are too close together to permit of their all being drilled by a gang of drills. In my construction I drill and tap alternately and in doing so feed the rod the full length of the desired spindle every time it moves, and when the rod has been fed far enough for the first section to be cut off all the series of drills and taps will operate at the same time. Its construction and operation are as follows:

1 represents the machine-bed. 2 is a rock-shaft journaled in the brackets 3 and $3^a$.

4 is an arm, (see more particularly Fig. 6,) carrying the roll 5, which roll engages with the groove 6 of the cam-plate $6^a$. This cam-plate is mounted on the short shaft 7, which shaft is journaled in brackets. (Not shown.) 8 is a large gear mounted on the end of this shaft. Immediately over the shaft 7 is the short driving-shaft 9, journaled in the brackets 10.

11 is the driving-pinion, which registers with the large gear 8. On the outer projecting end of this driving-shaft is placed a driving-pulley. (Not shown.)

12, 13, 14, 15, and 16 are a series of drill-spindles mounted in the standards 17, 18, 19, 20, and 21. These spindles are pivotally connected with the arms 22, mounted on the shaft 2.

24, 25, 26, 27, and 28 are drills carried by the several drill-spindles. 29 are pulleys mounted on the said spindles, by which they are independently rotated.

30 is a rock-shaft on the opposite side of the machine, journaled in the brackets 31.

32, Figs. 1 and 2, is a horizontal lever pivoted by one end to the arm 33 of shaft 30 and by the other end to one end of the lever 34. This latter lever is mounted on the short shaft or pin 35 of the bracket 36. 37 is a roll on the opposite end of the said lever to engage with the cam 38 on the shaft 7.

39, 40, 41, 42, and 43 are a series of tapping-spindles mounted in the frames 44. The inner ends of these spindles carry the taps 45, 46, 47, 48, and 49, while the opposite ends are connected with arms 50. 51 is a driving-shaft for these spindles, and it is journaled in the brackets 52. 53 is the driving-pulley for said shaft. On this shaft are mounted the spiral gears 54, which register with the horizontally-arranged spiral gears 55, mounted on the short spindles $55^a$, journaled in the frames 44. 56

(see also Fig. 3) is a bevel-gear on the lower end of these spindles, and 57 and 58 are bevel-gears on the said tapping-spindles, with which the said spindle-gears register in order to communicate right and left motions to the said tapping-spindles. 59 is one of a series of shipper-clutches on the said tapping-spindles. 60 is the shipper rock-shaft, journaled in the boxes 61, and 62 is one of a series of arms on said shaft to operate the said shipper-clutches. 63 is an arm on the end of said shipper rock-shaft, and 64, Fig. 2, is a link connecting this arm with one end of the lever 65 below the bed. 66 (see also Fig. 7) is a support for such lever. The opposite end of this lever is provided with the roll 67, adapted to engage the side piece 68 on the outside of the cam-plate $6^a$, whereby the necessary motion is imparted to the rock-shaft 60. A spring (not shown) holds the roll 67 in contact with the said side piece 68.

69 (see Figs. 1, 2, and 6) are standards supporting the feed-roll shafts 70 and 71. The upper shaft carries the driving-pulley 72, and gears 73 and 74 connect the two shafts. Square boxes 75 form the bearings for said shafts, and they are made vertically adjustable in the said standards. Their position is located, Fig. 6, by means of ribs $69^a$ (one only being shown) on the inner walls of such standards and the grooves $75^a$ in the sides of the boxes.

On the outer projecting ends of the roll-shafts are the grooved rolls 76 and 77, through which the square door-knob spindle-rod 78 passes.

79 is an adjusting-screw in the upper part of one of the standards to engage with the upper box, and 80 is a movable support for the box of the lower-roll spindle. The lower end of this support is threaded to engage with a threaded hole in the forked head 81 and is held firmly therein by means of the jam-nut 82.

83 is a bracket depending from beneath the bed, to which is pivotally supported the lever 84, whose outer end carries the roll 85 to engage with the cam 86 on the shaft 7, the other end of lever 84 being pivotally supported to the forked head 81. The construction just described controls the lower feed-roll 77, causing it to engage alternately with the strip or rod 78, it being understood that the said roll is not dropped far enough to throw the gears on the roll-spindles out of register with each other, but just enough to release said roll from engagement with the rod, so that it will stand still while the drilling and tapping operation, presently to be described, is going on.

$85^a$, Figs. 1 and 3, is a circular cutter mounted on the spindle $86^a$. The upper driving-spindle 87 carries the driving-pulley 88 and the gear 89 to register with the gear 90 of the cutter-spindle. The said spindles are journaled in the standards 91, rising from the sliding base on plate 92.

93 is a lever connecting the cutter-slide with the arm 94 of the rock-shaft 2, whereby a reciprocating motion is imparted to the said slide and the cutter carried to and from the rod 78 to sever a section therefrom.

95, Fig. 1, is a bracket rising from the bed and carrying the adjustable stop 96 to abut the end of the rod 78, which forms a positive stop against which said rod is fed.

97, 98, 99, 100, and 101 are drill-jigs having transverse holes to admit the drills and a square hole longitudinally through each one for the rod 78. One of such square holes 102 is shown at Fig. 3.

The operation of the machine is as follows: The square spindle-rod is fed from a reel (not shown) through straightening-rolls (not shown) to the drill-jig 97 (see Fig. 1) and carried far enough within the same for the first drill 24 to drill the hole $c$, (see Figs. 4 and 5,) which will be the last hole in the completed spindle when severed from the rod. The feeding-roll 77 is then automatically brought into engagement with rod 78 by means of the mechanism previously described, and the said rod is fed forward the full length of a completed spindle, the marks $d$, Fig. 4, representing where the several spindles when completed are to be cut off, until the hole $c$ is brought opposite the tap 45, when the feed-roll will drop and the mechanism operating the drills and taps will move them forward, so that tap 45 will tap hole $c$ and the drill 25 will drill hole $e$. Then the rod is fed forward the full length of the spindle required and the drill 26 will drill hole $f$ and the tap 46 will tap hole $e$. Then the rod is fed forward again and the drill 27 will drill hole $g$ and the tap 47 will tap hole $f$. Then the rod is fed forward and the drill 28 will drill hole $h$ and the tap 48 will tap hole $g$. The next forward feed will bring the hole $h$ opposite the last tap 49, and when the rod has been fed along so that the length of a spindle has passed beyond the cutter $85^a$ a complete spindle, tapped and drilled, will be cut off.

The above describes the process and operation on the end of the rod when it is first introduced into the drill-jigs, it being understood, however, that when the end of the rod or first section has moved to its second position the first drill 24 will form another hole in the rod, and as the rod progresses all the drills and taps will be in operation at the same time and the rod will present the appearance shown at Fig. 4.

It is necessary that the end of the rod 78 be brought against a fixed stop every time it is fed forward. When, therefore, the end of said rod is introduced into the first jig 97 and in position for the first drill 24 to act, a stop can be inserted in the bracket 95 of sufficient length to reach the end of such rod, and for the next position a shorter stop used, and so on, until the rod itself is able to reach the short stop 96. (Shown at Fig. 1.) Then as a section is cut from the end of this rod such rod will simply move forward a distance represented by one length or section and strike against the short stop 96, which stop will be used until another coil of rod is to be introduced.

When different lengths of spindles are to be drilled and tapped, the bracket 3ª, Fig. 1, is adapted to be shifted longitudinally along the bed of the machine, as well as the arms 22, 50, and 94, and fixed in a new position. 103 and 104, Fig. 3, are bolts which secure the drill-spindle and tapping-spindle brackets to the bed, which will also have to be loosened before shifting them.

If desired, the tapping mechanism may be dispensed with and the drilling and cutting off done on one machine and the tapping done on a separate machine.

Having thus described my invention, what I claim as new, and desire to secure by Letters Patent, is—

1. In an automatic machine, of the character described, the combination with a series of drills and their operating mechanism adapted to operate on a rod fed along in front of such drills and against a fixed stop, combined with means for severing a finished section from the end of said rod, for the purpose set forth.

2. In an automatic machine for drilling door-knob spindles, or articles of like character, the combination of a series of drills and mechanism for operating them, feed-rolls adapted to feed a rod along through fixed supports or drill-jigs a distance represented by the length of the finished article, a fixed stop against which the end of such rod is brought each time it is moved forward, and means for cutting off a finished section therefrom, for the purpose set forth.

3. The combination, in an automatic machine, of the character described, of a series of drill-spindles and their operating mechanism, feed-rolls, drill-jigs, or other like supports for a rod to be acted upon, a fixed stop, and a cutting-off apparatus, for the purpose set forth.

4. The combination, in an automatic machine, of the character described, of a series of independently-operating drill-spindles and mechanism therefor, feed-rolls for feeding a rod along the series of drills a distance represented by the length of a section to be severed from said rod, a fixed stop against which the end of the said rod is brought at each forward feed and a cutting-off apparatus, for the purpose set forth.

5. The combination, in an automatic machine, of the character described, of a series of drill-spindles adapted to act on a rod fed forward thereto, operating mechanism therefor, a series of tapping-spindles adapted to operate on the opposite side of said rod, mechanism for operating said tapping-spindles, feed-rolls adapted to feed said rod the full length of a required section, a fixed stop for the end of said rod, and a cutting-off apparatus, for the purpose set forth.

6. The combination, in an automatic machine, of the character described, consisting of a series of drill-spindles and their operating mechanism, feed-rolls for feeding a rod by the end of said spindle, and their operating mechanism, a fixed stop against which said rod is fed, cutting-off apparatus and its operating mechanism, combined so that each time the rod is fed forward against the said stop a distance representing the section to be cut off, the rolls cease feeding, while the drills are operating; and after such drills have performed their work, they will be retreated and the cutting-off mechanism brought into operation, for the purpose set forth.

7. The combination, in an automatic drilling and tapping machine, of the character described, consisting of a series of drilling and tapping spindles, carrying taps and drills, and their operating mechanism, feeding mechanism for feeding a metal strip or rod between the series of said drilling and tapping spindles and against a fixed stop, cutting-off mechanism for severing a completed section from the end of such rod, for the purpose set forth.

8. The combination, in an automatic drilling and tapping machine, for door-knob spindles and articles of like character, of a series of drilling and tapping spindles carrying the necessary drills and taps adapted to operate to and from the rod-feeding line, operating mechanism for said drilling and tapping spindles, feeding mechanism for feeding a rod between said drills and taps, said feeding mechanism adapted each time it engages the rod to feed said rod forward the full length of the finished article to be severed therefrom and against a fixed stop, cutting-off mechanism between said stop and the drilling and tapping mechanism, drill-jig supports substantially as shown, all combined so that, when the said rod has passed by the line of the series of drills and taps, all of said drills and taps will be operating at the same time, for the purpose set forth.

9. The combination, in an automatic drilling and tapping machine for door-knob spindles or articles of like character, consisting of a series of drilling and tapping spindles carrying drills and taps and adapted to operate to and from the feeding-line of a rod between such drills and taps, mechanism for operating such spindles, feeding device for feeding a rod to be drilled and tapped, drill-jigs or other like supports, a fixed stop against which the end of such rod is fed, and a cutting-off apparatus for severing a completed section therefrom, for the purpose set forth.

Signed at Bridgeport, in the county of Fairfield and State of Connecticut, this 15th day of June, A. D. 1897.

FRANKLIN B. SHUSTER.

Witnesses:
HENRY SCHADT,
JOHN B. CLAPP.